Oct. 6, 1936.  J. HORA  2,056,856
SLIDING CLASP FASTENER WITH NONMETALLIC FASTENER ELEMENTS
Filed Jan. 22, 1936
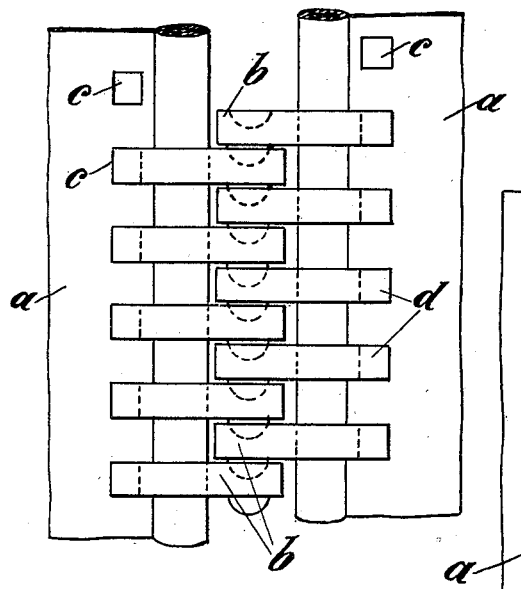
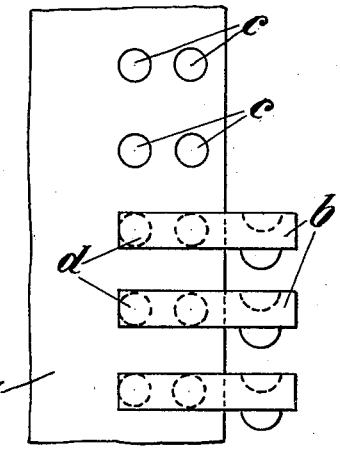
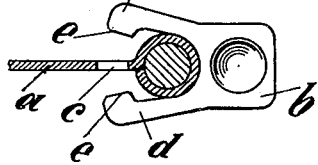
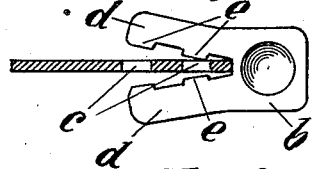
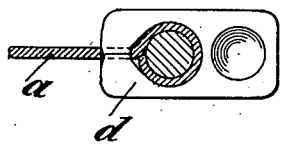
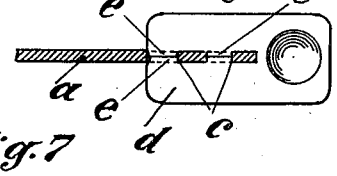
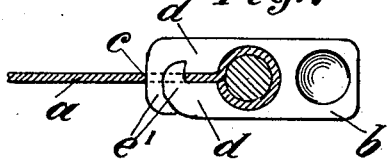
Inventor.

Patented Oct. 6, 1936

2,056,856

UNITED STATES PATENT OFFICE 2,056,856

SLIDING CLASP FASTENER WITH NON-METALLIC FASTENER ELEMENTS

Josef Hora, Wuppertal-Oberbarmen, Germany

Application January 22, 1936, Serial No. 60,242
In Germany September 26, 1934

2 Claims. (Cl. 24—205)

This invention relates to a sliding clasp fastener with non-metallic fastener elements. All sliding clasp fasteners of known type, the fastener elements of which consist of non-metallic material, have certain inconveniences because the fastener elements of non-metallic material can be fixed on the stringer only in a very complicated manner as compared with metallic fastener elements which mostly are fixed by clamping the edge of the stringer between the fixation arms of the elements, this being rapidly done mechanically. If the fixing is effected by casting or if the fastener elements are pressed under heat on to the upper and lower sides of the stringer, it often happens that the portion of the stringer exposed between the individual fastener elements becomes soiled by the material squeezed out during the pressing operation. The elements are also difficult to shape. If, however, the fastener elements are to be stuck or glued by means of solvents or by cements or glues, the stringer is also affected in the most undesirable manner, in that it is soiled and stiffened especially if solvents are employed, as the whole stringer must be saturated with the solvent in order to work rationally. During the fixation of the non-metallic fastener elements it happens further that the elements are not absolutely securely fixed on the stringer. If, however, the fastener elements, which in the commonly used sliding clasp fasteners consist of extremely small bodies, are not absolutely securely fixed and if in the fastener even a single fastener element is misplaced by a fraction of a millimetre, the whole sliding clasp fastener is absolutely useless.

The present invention is based on a construction wherein the ends of the arms of the fastener elements penetrate through the stringer and unite. The invention consists in providing holes in the stringer at the points where the fastener elements are mounted, through which holes small projections formed on the arms of the fastener elements project and unite.

The idea is not new to provide holes on the edges of the stringers of the fabric to be closed by the fastener, especially in sliding clasp fasteners with non-metallic fastener elements. In the known sliding clasp fasteners the holes in the fabric which are mostly made during the mounting of the fastener elements serve for a quite different purpose. They either serve only for the passage of lacing cords on which the fastener elements are suspended or in the case of a special type of fastener in which the elements are covered by the fabric the holes are formed by spikes arranged on the tongues of the fastener elements, which spikes penetrate into the fabric merely to produce a particularly secure fixation. In other fastener elements made of thin sheet metal their pointed corners are pierced through the cloth and bent over to fix the fastener elements on the stringer. In none of the sliding clasp fasteners of known type the holes in the fabric serve to interconnect the arms of the fastener elements by means of opposite projections on the arms or to protect the cloth itself, for instance against damage due to binding medium used for securing the fastener elements, as these arrangements cannot be used for non-metallic fastener elements which come exclusively in question in the present invention.

In other known sliding clasp fasteners with fastener elements made of non-metallic materials, the arms of the fastener elements are provided with bores in which a separate device in the form of a pointed pin extending through the stringer, of a rivet or anchor pieces provided with teeth on their under surface, is fitted and secured in position by cementing to the walls of the bore. The fitting of such holding devices which must be separately inserted into the holes of the elements from one or both sides and cemented therein is, however, so inconvenient and takes so much time that the arrangement cannot come into question for practical use owing to the high cost of production. According to the present invention the fixation on the stringers is effected in such a manner that the arms of each element are interconnected and form an integral member.

An embodiment of the invention is illustrated on enlarged scale in the accompanying drawing in which:—

Fig. 1 shows in elevation a portion of the new sliding clasp fastener.

Fig. 2 is a cross section through a stringer of the clasp fastener with the fastener element prior to the fixation.

Fig. 3 is a similar view showing the fastener element after the fixation.

Fig. 4 illustrates another embodiment of the invention and shows a portion of a stringer with fastener elements.

Fig. 5 is a cross section through this stringer with the fastener element prior to the fixation.

Fig. 6 shows the fastener element after the fixation, and

Fig. 7 shows another form of construction.

*a* designates the stringers for the fastener elements which at the points at which the elements *b* are mounted have small holes *c* which are stamped into the band, pierced into the same, produced by weaving or in any other manner. The arms $d$ of the non-metallic fastener elements $b$ are of such shape that they have one or several opposite projections $e$ each projection on one arm being opposite a projection on the other arm. The arms of the fastener elements are pressed together vertically or laterally, heat being applied if necessary according to the kind of material of which they consist, or interconnected by means of solvents or adhesive media which need not be applied on to the band. The fastener elements forming each an integral member are attached so firmly that they cannot be detached except forcibly or by destroying the whole sliding clasp fastener. By the novel manner of fixation of the non-metallic fastener elements many kinds of raw materials may be employed for making fastener elements which up to the present could not be employed because no method existed for securely fastening elements made of many non-metallic materials.

If using stringers with a reinforcing cord on the edge, one hole in the stringer is sufficient for each fastener element (Figs. 1 to 3).

The projections on the arms of the fastener elements may be omitted if the ends of the arms, when being pressed together, grip through the hole of the band and can thus be united with the aid of any suitable fixing medium.

When using flat stringers without edge reinforcing (Figs. 4 to 6), it is advisable to provide two or more holes at the point of the stringer where the fastener elements have to be mounted and to form on the inner face at the end of each fastener arm a corresponding number of projections.

In order to obtain a rigid fixation of the elements, the ends $e'$ of the arms of the same may overlap as shown in Fig. 7 so that, when tensile stress occurs, a spreading asunder of the arms is impossible. This form of construction presents the further advantage that merely by pressure and heat without employment of an adhesive, the arms pressed one over the other, firmly hold the fastener elements on the band so that they cannot possibly work loose and become detached.

I claim:—

1. A sliding clasp fastener with fastener elements of non-metallic material, comprising in combination two opposite carrying bands each having equally spaced holes, and fastener elements each having two rear arms each arm having at least one projection on its inner face, the opposite projections on the two arms projecting through the corresponding hole and being united so that the arms form an integral member to securely hold the fastener elements on said band.

2. In a sliding clasp fastener with fastener elements of non-metallic material, a pair of carrying bands, each band having two holes for each fastener element, and each fastener element having two corresponding projections on the inner face of each arm, the opposite projections engaging through corresponding holes and being united so that the arms form integral members to securely hold the fastener elements on said bands.

JOSEF HORA.